(12) United States Patent
Chang et al.

(10) Patent No.: US 11,888,755 B2
(45) Date of Patent: *Jan. 30, 2024

(54) MULTIDROP NETWORK SYSTEM

(71) Applicant: REALTEK SEMICONDUCTOR CORPORATION, Hsinchu (TW)

(72) Inventors: Yung-Le Chang, Hsinchu (TW); Wen-Chih Fang, Hsinchu (TW); Deng-Shian Wang, Hsinchu (TW); Shieh-Hsing Kuo, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 17/867,713

(22) Filed: Jul. 19, 2022

(65) Prior Publication Data

US 2023/0021997 A1 Jan. 26, 2023

(30) Foreign Application Priority Data

Jul. 23, 2021 (TW) .................................. 110127183

(51) Int. Cl.
*H04L 47/62* (2022.01)
*H04L 12/413* (2006.01)

(52) U.S. Cl.
CPC ........ *H04L 47/6225* (2013.01); *H04L 12/413* (2013.01)

(58) Field of Classification Search
CPC ............... H04L 47/6225; H04L 12/413; H04L 12/4035; H04L 12/40019; H04L 12/40084
See application file for complete search history.

(56) References Cited

U.S. PATENT DOCUMENTS

| | | | |
|---|---|---|---|
| 8,837,514 B2* | 9/2014 | Bareis | H04L 12/413 370/257 |
| 9,083,523 B2* | 7/2015 | Banks | H04L 1/1867 |
| 10,925,097 B2* | 2/2021 | Beruto | H04L 47/28 |
| 11,616,843 B2* | 3/2023 | Kim | H04L 12/40 709/223 |

(Continued)

*Primary Examiner* — Abdullahi E Salad
(74) *Attorney, Agent, or Firm* — WPAT, P.C

(57) ABSTRACT

A multidrop network system includes N network devices. The N network devices includes M transmission-permissible devices including a master device and at least one slave device, wherein M is not greater than N. Each transmission-permissible device has at least one identification code as its identification in the multidrop network system, and the M transmission-permissible devices have at least N identification codes. The M transmission-permissible devices obtain transmission opportunities in turn according to their respective identification codes in each round of data transmission. A $K^{th}$ device among the M transmission-permissible devices has multiple identification codes, and thus obtains multiple transmission opportunities in one round of data transmission. Each of the M transmission-permissible devices performs a count operation and generates a current count value; and when the current count value is the same as the identification code of a device of the M transmission-permissible devices, this device earns one transmission opportunity.

17 Claims, 4 Drawing Sheets

(56) References Cited

U.S. PATENT DOCUMENTS

| | | | |
|---|---|---|---|
| 11,665,020 B2* | 5/2023 | Zang | H04L 25/0272 |
| | | | 370/445 |
| 11,671,521 B2* | 6/2023 | Iyer | H04L 69/329 |
| | | | 370/336 |
| 2019/0230705 A1* | 7/2019 | Beruto | H04W 74/085 |

* cited by examiner

|  | 410 | | | | | | | |
|---|---|---|---|---|---|---|---|---|
| devices | #1 | #2 | #3 | #4 | #5 | #6 | #7 | #8 |
| identification codes (IDCs) | 0 | 255 | 255 | 255 | 255 | 1~7 | 255 | 255 |

| | 420 | | | | | | | | | | | | | |
|---|---|---|---|---|---|---|---|---|---|---|---|---|---|---|
| distribution of transmission opportunities | 0 | 1 | 2 | 3 | 4 | 5 | 6 | 7 | 0 | 1 | 2 | 3 | 4 | 5 | 6 | ………… |
| for devices based on IDCs | #1 | #6 | #6 | #6 | #6 | #6 | #6 | #6 | #1 | #6 | #6 | #6 | #6 | #6 | #6 | ………… |

Fig. 4

MULTIDROP NETWORK SYSTEM

BACKGROUND OF THE INVENTION

1. Field of the Invention

The present disclosure relates to a network system, especially to a multidrop network system.

2. Description of Related Art

The US patent application publication of publication number US2019/0230705A1 discloses a method to prevent packet collision in an Ethernet multidrop network. In regard to the above method, the number of nodes sustained by a multidrop network should be preplanned and each node in the multidrop network has only one transmission opportunity in a round of data transmission. Accordingly, the method cannot increase a number of transmission opportunity for a node according to the demand of this node.

SUMMARY OF THE INVENTION

An object of the present disclosure is to provide a multidrop network system as an improvement over the prior art.

An embodiment of the multidrop network system of the present disclosure includes N network devices, wherein the N is an integer greater than one. The N network devices includes a master device and (N−1) slave device(s). Each of the N network devices has at least one identification code as its identification in the multidrop network system. The N network devices include M transmission-permissible devices earning their respective transmission opportunities in turn in each round of data transmission of the multidrop network system, wherein the M transmission-permissible devices include the master device and at least one of the (N−1) slave device(s), and the M is an integer greater than one but not greater than the N. Each of the M transmission-permissible devices performs a count operation to generate a current count value, and when the current count value reaches a first extreme value, the current count value is reset to a second extreme value, wherein the first extreme value and the second extreme value jointly define a count range of the current count value. The first extreme value and the second extreme value are an upper limit and a lower limit of the count range respectively, or are the lower limit and the upper limit of the count range respectively. When the identification code of a device of the M transmission-permissible devices is the same as the current count value, this device earns one transmission opportunity. A total number of the identification codes of the M transmission-permissible devices is not fewer than the N even though the M is fewer than the N, which implies that one of the M transmission-permissible devices has a plurality of identification codes when the M is fewer than the N; and since each identification code is equal to the current count value at some point in a round of data transmission, the difference between the first extreme value and the second extreme value is not fewer than the N. During an $X^{th}$ round of data transmission of the multidrop network system, a $K^{th}$ device of the M transmission-permissible devices has multiple identification codes and earns multiple transmission opportunities, wherein the total number of the identification codes of the M transmission-permissible devices is greater than the M, the K is a positive integer not greater than the M, and the X is a positive integer.

These and other objectives of the present invention will no doubt become obvious to those of ordinary skill in the art after reading the following detailed description of the preferred embodiments that are illustrated in the various figures and drawings.

BRIEF DESCRIPTION OF THE DRAWINGS

FIG. 4 shows the assignment of identification codes to the N network devices of FIG. 1 based on another embodiment of the present disclosure and shows the consequent distribution of transmission opportunities.

DETAILED DESCRIPTION OF THE PREFERRED EMBODIMENTS

The present specification discloses a multidrop network system capable of increasing a number of transmission opportunity for a node of the multidrop network system according to the transmission demand of this node. The background knowledge of a multidrop network system is found in the IEEE 802.3 standard and the US patent application publication of publication number US2019/0230705A1.

Figure 1:
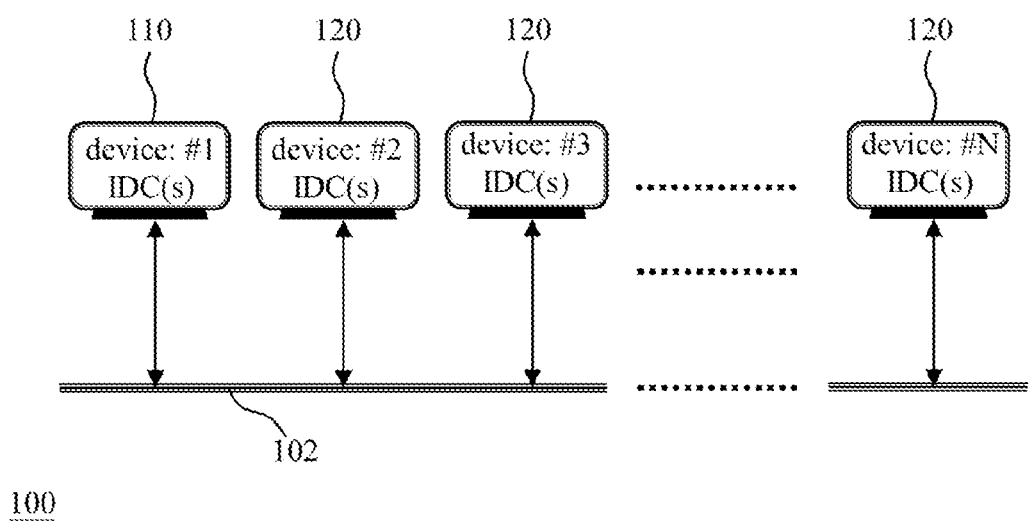
FIG. 1 shows an embodiment of the multidrop network system of the present disclosure.

FIG. 1 shows an embodiment of the multidrop network system of the present disclosure. The configuration of the multidrop network system 100 of FIG. 1 is based on the IEEE 802.3 standard and includes N network devices #1, #2, #3, . . . , and #N (i.e., N nodes), wherein the N is an integer greater than one. The N network devices exchange data through a physical transmission medium 102 (e.g., twisted pair cable or optical cable), and include a master device 110 and (N−1) slave device(s) 120. Each of the N network devices has at least one identification code(s) (IDC(s)) as its own identification in the multidrop network system 100.

Figure 2:
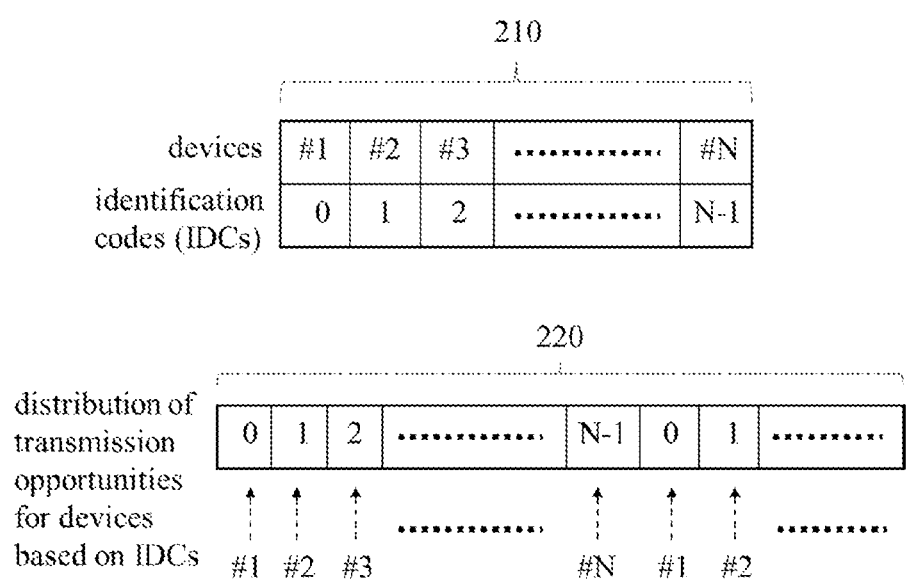
FIG. 2 shows the assignment of identification codes to the N network devices of FIG. 1 based on a one-on-one manner and shows the consequent distribution of transmission opportunities.

In regard to the embodiment of FIG. 1, each of the N network devices performs a count operation (e.g., an incremental count operation counting from a count lower limit to a count upper limit, or a decremental count operation counting from the count upper limit to the count lower limit) to generate a current count value, wherein all the N network devices have the same current count value and the cycle of the count operation is equal to the cycle of one round of data transmission of the N network devices. When the identification of a device of the N network devices is the same as the current count value, this device earns one transmission opportunity. When a device of the N network devices has multiple identification codes (e.g., three identification codes), this device earns multiple transmission opportunities (e.g., three transmission opportunities). It is noted that based on a one-on-one manner, each of the N network devices has only one identification code, and this identification code falls within the count range (i.e., the range between the count lower limit and the count upper limit) of the count operation; accordingly, each of the N network devices will obtain only one transmission opportunity in a round of data transmission regardless of its demand for transmission. FIG. 2 includes an assignment chart 210 showing the assignment of identification codes (i.e., 0, 1, 2, . . . , and (N−1) in FIG. 2) to the N network devices (i.e., #1, #2, #3, . . . , and #N in FIG. 2) based on the above-mentioned one-on-one manner and includes a distribution chart 220 showing the consequent distribution of transmission opportunities. In regard to FIG. 2, each grid in the distribution chart 220 stands for a transmission time slot, the length of a transmission time slot is the same as or different from the length of another transmission time slot, and the number in a grid indicates the identification code of the network device occupying the transmission time slot of this grid.

In regard to the embodiment of FIG. 1, the N network devices include M transmission-permissible devices earning their respective transmission opportunities in turn in each round of data transmission of the multidrop network system 100, wherein the M is an integer greater than one but not greater than the N; in other words, some or all of the N network devices are the M transmission-permissible devices. The M transmission-permissible devices include the master device 110 and at least one of the (N−1) slave device(s) 120. Each of the M transmission-permissible devices performs the aforementioned count operation to generate the aforementioned current count value. When the M is fewer than the N, the N network devices include the M transmission-permissible devices and the other Y network device(s), and the Y network device(s) has/have the identification code(s) falling without the aforementioned count range and perform(s) the count operation so that the Y network device(s) cannot obtain any transmission opportunity, wherein the Y is equal to (N−M).

On the basis of the above description, when the current count value of the M transmission-permissible devices reaches a first extreme value in a current round of data transmission, each of the M transmission-permissible devices resets its current count value to a second extreme value for the start of a next round of data transmission, which means that the first extreme value and the second extreme value jointly define the count range of the current count value. The first extreme value and the second extreme value are an upper limit and a lower limit of the count range respectively when the count operation is an incremental count operation, or are the lower limit and the upper limit of the count range respectively when the count operation is a decremental count operation. When the identification code of a device of the M transmission-permissible devices is the same as the current count value, this device earns its transmission opportunity.

In an embodiment of the present disclosure, a total number (hereinafter referred to as "Q") of the identification codes of the M transmission-permissible devices is not fewer than the N and is greater than the M, which implies that some of the M transmission-permissible devices has/have a plurality of identification codes; and since each identification code is equal to the current count value (i.e., a value between the upper and lower limits of the count range) at some point in a round of data transmission, the difference (i.e., the count range) between the first extreme value and the second extreme value is not fewer than the N and is greater than the M. More specifically, providing each increment/decrement of the count operation is one, the difference (i.e., the count range) between the first extreme value and the second extreme value is equal to the Q. During an $X^{th}$ round of data transmission of the multidrop network system 100, if a $K^{th}$ device of the M transmission-permissible devices has multiple identification codes (e.g., S identification codes, wherein S is greater than one but not greater than (Q−1)), the $K^{th}$ device earns multiple transmission opportunities (e.g., S transmission opportunities) in the $X^{th}$ round of data transmission, wherein the K is a positive integer not greater than the M, and the X is a positive integer. The multiple identification codes of the $K^{th}$ device could be inconsecutive to satisfy the $K^{th}$ device's actual demand for transmission.

Figure 3:
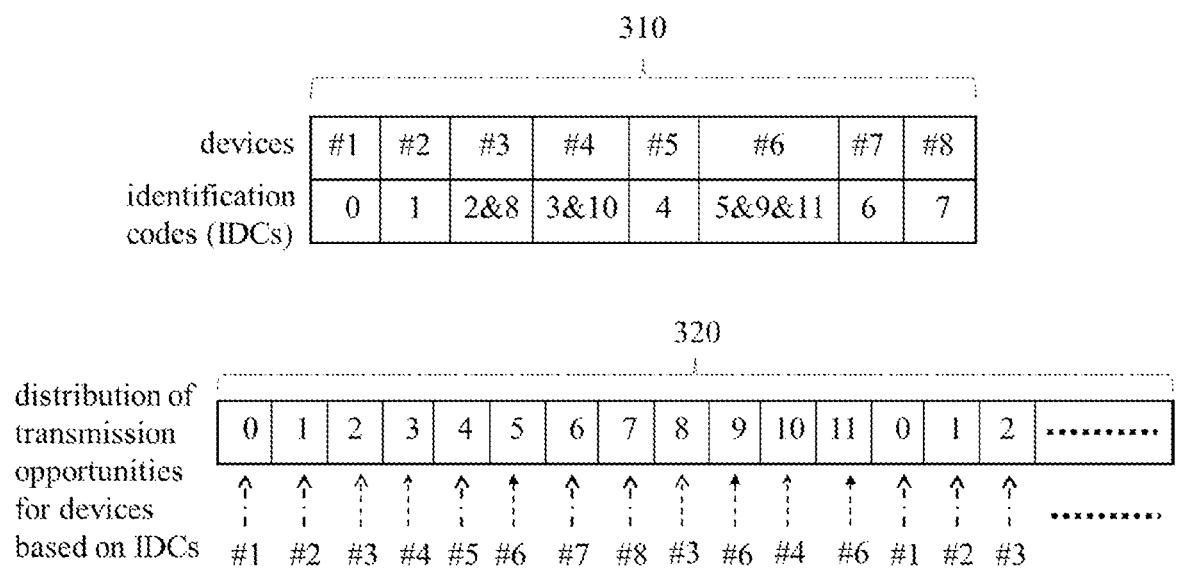
FIG. 3 shows the assignment of identification codes to the N network devices of FIG. 1 based on an embodiment of the present disclosure and shows the consequent distribution of transmission opportunities.

In an embodiment of the present disclosure, the difference (i.e., the count range) between the first extreme value and the second extreme is greater than the N, which implies that the total number of the identification codes of the M transmission-permissible devices is greater than the N. In an exemplary implementation of this embodiment, each increment of the count operation is one, and the assignment chart 310 showing the assignment of identification codes to the N network devices and the distribution chart 320 showing the consequent distribution of transmission opportunities are shown in FIG. 3, wherein the N is equal to the M and thus the N network devices are the M transmission-permissible devices. In regard to FIG. 3, the N is equal to 8, and #1, #2, . . . , and #8 denote the N network devices respectively; the N network devices have twelve identification codes (i.e., 0, 1, 2, . . . , and 11 in FIG. 3) in total; the lower and upper limits of the count range of the current count value are 0 and 11 respectively; and the network device #3 has two identification codes (i.e., 2 and 8 in FIG. 3), the network device #4 has two identification codes (i.e., 3 and 10 in FIG. 3), and the network deice #6 has three identification codes (i.e., 5, 9, and 11 in FIG. 3). In light of the above, the network device #3 will obtain two transmission opportunities amounted to one sixth (i.e., $2/12=1/6$) of the total transmission opportunities in a round of data transmission; the network device #4 will obtain two transmission opportunities amounted to one sixth (i.e., $2/12=1/6$) of the total transmission opportunities in the round of data transmission; the network device #6 will obtain three transmission opportunities amounted to one fourth (i.e., $3/12=1/4$) of the total transmission opportunities in the round of data transmission; and each of the other network devices will obtain only one transmission opportunity amounted to one twelfth (i.e., $1/12$) of the total transmission opportunities in the round of data transmission. It should be noted that the total number of identification codes of the N network devices, the number of identification code(s) of each network device, and the lower and upper limits of the count range of the current count value can be determined according to the demand for implantation, and they are not limited to the embodiments of the present disclosure.

In an embodiment of the present disclosure, the difference (i.e., the count range) between the first extreme value and the second extreme is equal to the N and greater than the M, which indicates that the total number of the identification codes of the M transmission-permissible devices is equal to the N, the M transmission-permissible devices are a part of the N network devices, and some of the M transmission-permissible devices has/have a plurality of identification codes. In an exemplary implementation of this embodiment, each increment of the count operation is one, and the assignment chart 410 showing the assignment of identification codes to the N network devices and the distribution chart 420 showing the consequent distribution of transmission opportunities are shown in FIG. 4, wherein some of the N network devices (i.e., the network devices #1 #6 in FIG. 4) are the M transmission-permissible devices and the other network devices (i.e., the network devices #2~5 and #7~8) cannot obtain transmission opportunities. In regard to FIG. 4, the N is equal to 8, and #1, #2, . . . , and #8 denote the N network devices respectively; the N network devices have eight identification codes (i.e., 0, 1, 2, . . . , and 7 in FIG. 4) falling within the count range of the current count value, and the lower and upper limits of the count range are 0 and 7 respectively; and the M transmission-permissible devices are the network device #1 and the network device #6; the network device #1 has one identification code (i.e., 0 in FIG. 4) and the network device #6 has seven identification codes (i.e., 1~7 in FIG. 4); each of the network devices #2~#5 and #7~8 has an identification code (i.e., 255 in FIG. 4) out of the count range. In light of the above, the network device #1 will obtain one transmission opportunity amounted to one eighth (i.e., ⅛) of the total transmission opportunities in a round of data transmission; the network device #6 will obtain seven transmission opportunities amounted to seven eighth (i.e., ⅞) of the total transmission opportunities in the round of data transmission; and each of the other network devices will obtain no transmission opportunity in the round of data transmission.

In an exemplary implementation of the embodiment of FIG. 1, before a start of an earliest round of data transmission of the multidrop network system 100, the identification codes of the N network devices are already determined and fixed; and in another exemplary implementation of the embodiment of FIG. 1, after a start of the earliest round of data transmission, the identification codes of the N network devices are adjusted according to the N network devices' demand for transmission. For example, in FIG. 4 each of the network devices #2~#5 and #7~#8 has an identification code greater than the upper limit of the count range in an $X^{th}$ round of data transmission and thus these network devices cannot obtain any transmission opportunity in the $X^{th}$ round of data transmission; and after the $X^{th}$ round of data transmission, the identification code of at least one device (hereinafter referred to as "device #Z") of the network devices #2~#5 and #7~#8 is adjusted to be within the count range so that the device #Z can obtain at least one transmission opportunity during an $(X+1)^{th}$ round of data transmission. For example, in FIG. 4 the network device #6 has multiple identification codes and thus it can obtain multiple transmission opportunities in the $X^{th}$ round of data transmission; and after the $X^{th}$ round of data transmission, the multiple identification codes of the network device #6 are adjusted to be the same identification code (e.g., 5) which could be one of the multiple identification codes, and then the network device #6 can obtain only one transmission opportunity during the $(X+1)^{th}$ round of data transmission.

Please refer to FIG. 1. In an exemplary implementation, the N network devices adopt a known/self-developed communication protocol to perform a communication operation. The N network devices include a designated device (e.g., the master device 110) and (N−1) non-designated device(s) (e.g., the (N−1) slave device(s) 120); and the designated device is one of the M transmission-permissible devices. The designated device learns at least one transmission demand of the (N−1) non-designated device(s) through the communication operation; for example, some non-designated devices make requests about their transmission demands while the other non-designated devices make no requests, and thus the designated device can ascertain the transmission demands of all the non-designated devices. The designated device determines an identification (ID) assignment for the N network devices according to a transmission demand of the designated device and the transmission demand(s) of the (N−1) non-designated device(s). Each of the (N−1) non-designated device(s) is notified of the ID assignment through the communication operation and determines its identification code.

In regard to the above exemplary implementations, each of the N network devices includes an upper layer circuit (not shown) and a lower layer circuit (not shown); the upper layer circuit adopts the communication protocol to control the communication operation; and the lower layer circuit is used for data transmission. For example, the upper layer circuit is a media access control circuit (MAC) or an electronic control unit (ECU), and the lower layer circuit is a physical layer circuit (PHY). Since the MAC, the ECU, and the PHY are common in this technical field, their detail is omitted here.

It should be noted that people of ordinary skill in the art can selectively use some or all of the features of any embodiment in this specification or selectively use some or all of the features of multiple embodiments in this specification to implement the present invention as long as such implementation is practicable; in other words, the present invention can be carried out flexibly in accordance with the present disclosure.

To sum up, the multidrop network system of the present disclosure can increase a number of transmission opportunity for a node of the multidrop network system according to the transmission demand of this node.

The aforementioned descriptions represent merely the preferred embodiments of the present invention, without any intention to limit the scope of the present invention thereto. Various equivalent changes, alterations, or modifications based on the claims of the present invention are all consequently viewed as being embraced by the scope of the present invention.

What is claimed is:

1. A multidrop network system comprising N network devices, the N network devices including a master device and (N−1) slave device(s), each of the N network devices having at least one identification code as an identification in the multidrop network system, M transmission-permissible devices of the N network devices earning transmission opportunities in turn in each round of data transmission of the multidrop network system, each of the M transmission-permissible devices performing a count operation to generate a current count value, when the current count value reaching a first extreme value, the current count value is reset to a second extreme value, and the first extreme value and the second extreme value jointly define a count range of the current count value, wherein:

the M transmission-permissible devices include the master device and one of the (N−1) slave device(s);

the N is an integer greater than one, and the M is an integer greater than one but not greater than the N;

the first extreme value and the second extreme value are an upper limit and a lower limit of the count range respectively, or are the lower limit and the upper limit of the count range respectively;

a total number of the identification codes of the M transmission-permissible devices is not fewer than the N, and a difference between the first extreme value and the second extreme value is not fewer than the N;

when the identification code of a transmission-permissible device among the M transmission-permissible devices is the same as the current count value, the transmission-permissible device earns a transmission opportunity; and during an $X^{th}$ round of data transmission of the multidrop network system, a $K^{th}$ device of the M transmission-permissible devices has multiple identification codes and earns multiple transmission opportunities, in which the total number of the identification codes of the M transmission-permissible devices is greater than the M, the K is a positive integer not greater than the M, and the X is a positive integer.

2. The multidrop network system of claim 1, wherein the difference between the first extreme value and the second extreme value is greater than the N, and the total number of the identification codes of the M transmission-permissible devices is greater than the N.

3. The multidrop network system of claim 2, wherein the M is equal to the N.

4. The multidrop network system of claim 1, wherein the difference between the first extreme value and the second extreme value is equal to the N, the M is fewer than the N, and the total number of the identification codes of the M transmission-permissible devices is equal than the N.

5. The multidrop network system of claim 4, wherein during the $X^{th}$ round of data transmission, the identification code of each of Y network device(s) of the N network devices falls without the count range, the Y network device(s) is/are not included in the M transmission-permissible devices, the Y is a positive integer, and the Y is not greater than the N minus the M.

6. The multidrop network system of claim 5, wherein after the $X^{th}$ round of data transmission, the identification code of each of the Y network device(s) is adjusted to fall within the count range; and during a next round of data transmission following the $X^{th}$ round of data transmission, the M transmission-permissible devices include the Y network device(s).

7. The multidrop network system of claim 5, wherein during the $X^{th}$ round of data transmission, the Y network device(s) perform(s) the count operation.

8. The multidrop network system of claim 1, wherein during the $X^{th}$ round of data transmission, the multiple identification codes of the $K^{th}$ device are not consecutive.

9. The multidrop network system of claim 1, wherein a number of the multiple identification codes of the $K^{th}$ device is determined according to the $K^{th}$ device's demand for transmission.

10. The multidrop network system of claim 1, wherein before a start of an earliest round of data transmission of the multidrop network system, the identification codes of the N network devices are already determined and fixed.

11. The multidrop network system of claim 1, wherein after a start of an earliest round of data transmission of the multidrop network system, the identification codes of the N network devices are adjusted according to the N network devices' demand for transmission.

12. The multidrop network system of claim 11, wherein after the $X^{th}$ round of data transmission, the multiple identification codes of the $K^{th}$ device are adjusted to be a same identification code.

13. The multidrop network system of claim 12, wherein the same identification code is one of the multiple identification codes.

14. The multidrop network system of claim 1, wherein the N network devices adopt a communication protocol to perform a communication operation; the N network devices include a designated device and (N−1) non-designated device(s); the designated device is one of the M transmission-permissible devices; the designated device learns at least one transmission demand of the (N−1) non-designated device(s) through the communication operation; the designated device determines an identification (ID) assignment according to a transmission demand of the designated device and the at least one transmission demand of the (N−1) non-designated device(s); and each of the (N−1) non-designated device(s) is notified of the ID assignment through the communication operation and determines its identification code.

15. The multidrop network system of claim 14, wherein the designated device is the master device.

16. The multidrop network system of claim 14, wherein each of the N network devices includes an upper layer circuit and a lower layer circuit; the upper layer circuit adopts the communication protocol to control the communication operation; and the lower layer circuit is used for data transmission.

17. The multidrop network system of claim 16, wherein the upper layer circuit is a media access control circuit (MAC) or an electronic control unit (ECU), and the lower layer circuit is a physical layer circuit (PHY).

* * * * *